United States Patent
Oppermann et al.

(10) Patent No.: US 9,061,444 B2
(45) Date of Patent: Jun. 23, 2015

(54) STARTING MATERIAL FOR A FLAT-DOMED MOLDED PLASTIC PART, IN PARTICULAR A HOUSING PART, AND MOLDED PART CREATED THEREFROM

(75) Inventors: Michael Oppermann, Ansbach (DE); André Schmidt, Ansbach (DE)

(73) Assignee: OECHSLER AKTIENGESELLSCHAFT, Ansbach (DE)

( * ) Notice: Subject to any disclaimer, the term of this patent is extended or adjusted under 35 U.S.C. 154(b) by 274 days.

(21) Appl. No.: 13/818,229

(22) PCT Filed: Jul. 8, 2011

(86) PCT No.: PCT/EP2011/003424
§ 371 (c)(1),
(2), (4) Date: Feb. 21, 2013

(87) PCT Pub. No.: WO2012/025169
PCT Pub. Date: Mar. 1, 2012

(65) Prior Publication Data
US 2013/0164470 A1 Jun. 27, 2013

(30) Foreign Application Priority Data
Aug. 25, 2010 (DE) .......................... 10 2010 035 438

(51) Int. Cl.
*B28B 23/00* (2006.01)
*B29D 22/00* (2006.01)
(Continued)

(52) U.S. Cl.
CPC . *B29B 11/16* (2013.01); *B32B 5/02* (2013.01); *B32B 27/06* (2013.01); *B29C 51/00* (2013.01);
(Continued)

(58) Field of Classification Search
CPC ........ B29C 51/00; B29C 51/08; B29C 51/14; B32B 5/02; B32B 27/00; B32B 27/06; B32B 1/08; B28B 23/00; B29D 22/00; B29D 23/00
USPC ........................................ 428/36.4, 35.6, 36.1
See application file for complete search history.

(56) References Cited

U.S. PATENT DOCUMENTS

2006/0240235 A1 10/2006 Boutghrit et al.
2007/0199797 A1 8/2007 Sell et al.

FOREIGN PATENT DOCUMENTS

AT 331500 B 8/1976
(Continued)

OTHER PUBLICATIONS

International Search Report (PCT/ISA/210) issued on Oct. 24, 2011, by the European Patent Office as the International Searching Authority for International Application No. PCT/EP2011/003424.
(Continued)

*Primary Examiner* — Michael C Miggins
(74) *Attorney, Agent, or Firm* — Buchanan Ingersoll & Rooney PC

(57) ABSTRACT

In order to reduce the wall thickness of housing parts produced by means of plastic injection molding and equipped with decorative layers, such as battery covers of mobile devices, it is recommended to change to a starting material that is a fiber composite material equipped on one side with the decorative layer, from which starting material the housing part is formed in a deep drawing process. Even if a thick decorative layer the outer surface of which is highly embossed for haptic reasons is applied, the resulting wall thickness remains far below the wall thickness for a housing part that can be produced by means of injection molding. An even further reduction of the wall thickness is achieved if a fiber composite material is used as the deep drawing starting material for the shaped part, the decorative material being directly foamed or injected onto the surface of the fiber composite material.

9 Claims, 1 Drawing Sheet

(51) Int. Cl.

| | | |
|---|---|---|
| *B29D 23/00* | (2006.01) | |
| *B32B 1/08* | (2006.01) | |
| *B29B 11/16* | (2006.01) | |
| *B32B 5/02* | (2006.01) | |
| *B32B 27/06* | (2006.01) | |
| *B32B 1/00* | (2006.01) | |
| *B32B 3/30* | (2006.01) | |
| *B32B 7/12* | (2006.01) | |
| *B32B 27/08* | (2006.01) | |
| *B32B 27/12* | (2006.01) | |
| *B29C 51/00* | (2006.01) | |
| *B32B 27/00* | (2006.01) | |
| *B29C 51/08* | (2006.01) | |
| *B29C 45/14* | (2006.01) | |
| *B29C 51/02* | (2006.01) | |
| *B29C 51/14* | (2006.01) | |
| *B29L 31/34* | (2006.01) | |

(52) U.S. Cl.
CPC ............... *B32B 27/00* (2013.01); *B29C 51/08* (2013.01); *B28B 23/00* (2013.01); *B32B 1/08* (2013.01); *B29D 23/00* (2013.01); *B29D 22/00* (2013.01); *Y10T 428/1362* (2015.01); *Y10T 428/1348* (2015.01); *B29C 45/14811* (2013.01); *B29C 51/02* (2013.01); *B29C 51/14* (2013.01); *B29L 2031/3437* (2013.01); *B29L 2031/3475* (2013.01); *B32B 1/00* (2013.01); *B32B 3/30* (2013.01); *B32B 5/024* (2013.01); *B32B 7/12* (2013.01); *B32B 27/08* (2013.01); *B32B 27/12* (2013.01); *B32B 2260/021* (2013.01); *B32B 2260/046* (2013.01); *B32B 2262/101* (2013.01); *B32B 2305/188* (2013.01); *B32B 2307/738* (2013.01)

(56) References Cited

FOREIGN PATENT DOCUMENTS

| | | |
|---|---|---|
| CN | 101121310 A | 2/2008 |
| DE | 10 2004 053131 A1 | 5/2006 |
| EP | 1 157 799 A1 | 11/2001 |
| JP | H08-108509 A | 4/1996 |
| TW | I327959 B | 8/2010 |

OTHER PUBLICATIONS

International Preliminary Report on Patentability (PCT/IPEA/409) issued on May 18, 2012, by the European Patent Office as the International Searching Authority for International Application No. PCT/EP2011/003424.

Notification of Transmittal of Translation of the International Preliminary Report on Patentability (Chapter I or Chapter II)(PCT/IB/338) and International Preliminary Report on Patentability (Translation)(Form PCT/IPEA/409) issued on Feb. 28, 2013, in corresponding International Application No. PCT/EP2011/003424. (4 pages).

Taiwanese Examination Report and Search Report dated Sep. 17, 2014 issued in the corresponding Taiwanese Patent Application No. 100129657 and English language translation (6 pages).

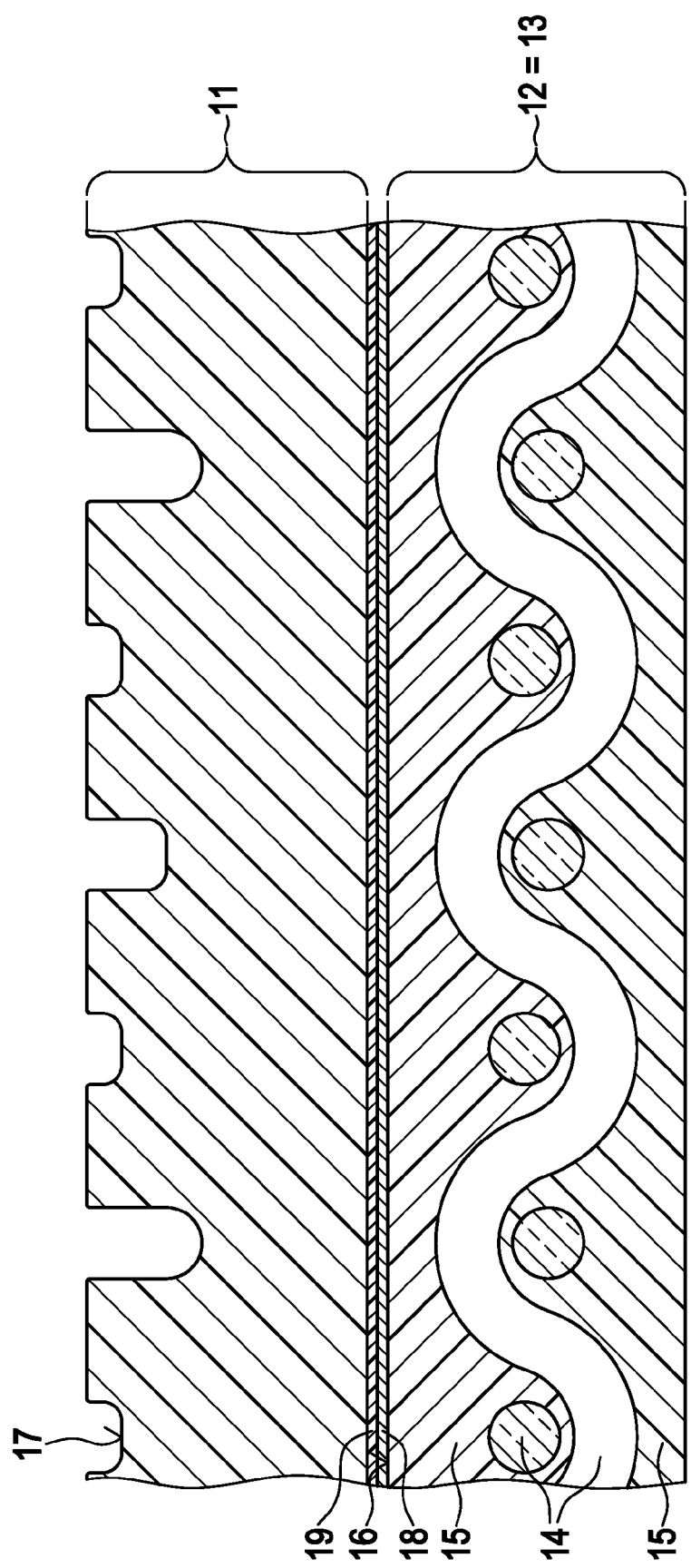

STARTING MATERIAL FOR A FLAT-DOMED MOLDED PLASTIC PART, IN PARTICULAR A HOUSING PART, AND MOLDED PART CREATED THEREFROM

The invention relates to a thin-walled flat-domed molded part, in particular a housing part for mobile electronic appliances.

A cell phone is known from EP 1 157 799 A1 whose back housing shell consists of a plastics film as base layer, to which a leather or otherwise "futuristic" decorative layer has been applied. This composite is thermoformed and finally back-injected with plastics in an injection mold to stabilize it mechanically, which results only in a relatively thick-walled housing shell of comparatively low mechanical stability in return for major expenditure on production facilities.

However, the market demands ever flatter mobile appliances such as music storage devices, mini computers or network access devices and similar consumer electronics, and in particular also in the case of cell phones. The height of three-dimensional housing parts such as that of the battery cover is accordingly also shrinking. This is conventionally produced from a thermoplastic material as a multiple panel in a plastics injection mold. For reasons related to injection molding technology, and because of minimum requirements with regard to bending and torsional stiffness for mechanical stabilization of the housing, the wall thickness of such a separately handled, comparatively large-area housing part cannot simply be reduced at will. Currently, a wall thickness of around 1.5 mm is regarded as the minimum for a thermoplastic molded part. The resultant wall thickness is increased by approx. 0.4 mm typically to 1.9 mm, however, if a decorative layer, for instance a plastics film imitating leather grain, is applied for visual or tactile reasons to the outer surface of the injection-molded housing part, said plastics film then conventionally also being covered with a crystal clear thermoplastic protective layer to cover over edges. The requirement for such marketable design of higher quality consumer products is directly contrary to the injection molding-related efforts to achieve thin-walled plastics molded parts.

In recognition of such circumstances, the technical problem underlying the present invention is that of making molded parts of the above type altogether still thinner-walled despite decorative coatings.

This cannot be achieved using a base film back-injected for mechanical stabilization as claimed in EP 1 157 799 A1 discussed above.

The desired, extremely thin and only flat-domed molded part is also not achievable if, according to DE 10 2004 053 131 A1, a flat fiber composite semi-finished product is bonded to a decorative layer, preferably with interposition of a protective film, in the course of compression molding thereof, for instance to yield a motor vehicle instrument panel. The semi-finished product is intended to display good thermoforming properties, if it consists for instance of one third (by weight) of each of thermoplastic long fibers, natural material long fibers (such as flax) and a short-fiber wood component (for instance in the form of wood flour). The fibers are entangled to form a nonwoven structure, which is additionally strengthened prior to forming by needle-punching. During forming, the plastics fibers fuse, in order on the one hand to bind the natural fibers in the wood flour and on the other hand to fuse on the decorative layer. The plastics fibers thus do not contribute to the mechanical stressability of the molded part in the manner of a fiber composite material. Such a nonwoven fabric of flax fibers which are entangled together, then needle-punched and finally fused together in wood flour obviously does not result in optimization of starting material for extremely thin and nevertheless mechanically stable plastics molded parts.

US 2003/0240235 A1 relates to producing a defined zone on a core of thermoplastic fiber composite material, which zone acts as a hinge for flap movement, in particular for deployment of an airbag out of a motor vehicle instrument panel. To this end, a layer of flexible and highly extensible material is impressed from a surface (optionally congruently also on the opposing surface) under pressure and heat onto the core and then the core equipped in this way is provided with an all-encompassing decorative layer, which may comprise a thermoplastic material or a woven fabric. A maximally thin-walled design is of no relevance here and also cannot be achieved thereby.

The problem outlined above is, on the other hand, solved by the essential features indicated in the main claim. According thereto, in particular a molded part injection-molded from thermoplastic material is no longer subsequently provided with the decorative layer, but rather the molded part is provided with such a decoration while it is being thermoformed as a thin support from a multi-ply fiber composite material, laminated in the manner of a sandwich with a plastics matrix.

Such a fiber composite material is commercially available in web- or sheet form in particular for manufacturing motor vehicle body parts such as bumpers and spare wheel pans. Because of the good mechanical properties of the fiber composite, in particular its high bending and torsional stiffness, it needs a thickness of the order of just one third of an injection-molded wall thickness for otherwise identical shaping. The fiber composite material is equipped with a backing film for the application of adhesive tape for the decorative layer. Even with such application of a decorative layer to one of the two sandwich surfaces, the resultant formed part thermoformed from a blank has a smaller wall thickness than a comparable, as yet undecorated, injection molding.

This is because the fiber composite material, in the form of the fiber-reinforced basic structure, typically measures only approx. 0.5 mm in thickness and may therefore, in the interests of clear tactile profiling, be provided with a comparatively thick decorative layer of for example 0.4 mm, plus an adhesive tape and backing film each 0.1 mm thick. This results in a total thickness, which, with markedly better tactile properties, at 1.1 mm is a good 30% thinner than a coated injection molding of the above-discussed type, this being achieved in combination with at least the same mechanical properties, for instance with regard to the bending and torsional stiffness of a resultant molded part of identical geometry. The formed part made from such a starting material is for example a stable housing part of thin-wall technology with a decorative surface which is attractive in tactile terms (of leather or artificial leather for example).

To simplify the description, only fiber-reinforcing woven fabrics of fiber composite material will be discussed, but for the purposes of the present invention these may equally well be single- or multi-ply and take the form of knitted fabric, laid fabric, fiber strands (rovings), felt and similar mats. The fiber structures used are generally oriented in a defined manner, and are laminated with thermosetting or, preferably, with a thermoplastic matrix to yield the sandwich-type fiber composite material.

In particular in the case of enhanced mechanical requirements, it would in itself be obvious to use carbon fibers for the reinforcing woven fabric. These are not only particularly strong, but their woven structure in formed parts also in itself provides a pleasant feel and high-quality appearance. However, due to the electrically conductive properties of carbon and the resultant screening behavior, such formed parts cannot be used in appliances into which for example a radio antenna is incorporated, for instance cell phones. This shortcoming does not arise with the likewise extremely strong Kevlar or aramid fibers, but because of the demand for such fibers for instance for protective helmets and bullet-proof vests, such fabrics are difficult to come by at reasonable prices for consumer goods. Therefore, for practical purposes, in general only laminates with conventional glass fiber woven fabrics are available for use, these also providing very good levels of mechanical strength, in particular in multi-ply form.

Even after coating with the decorative layer and while exhibiting at least comparable mechanical properties, this starting material used here according to the invention is thus thinner than an as yet uncoated molded part produced by conventional injection molding. The decorative layer is in particular adhesively bonded to one of the two outer faces of the laminated fabric, but may also for example be welded on depending on the material pairing. Depending on equipment requirements, the decorative layer may be real leather or a plastics film with desired surface texturing or indeed a textile layer or even a thin wood or metal layer.

To reduce the wall thickness further, it may even be contemplated to laminate the reinforcing fabric of the fiber composite material with the plastics matrix abnormally not on both sides but, with good, thorough moistening of the fabric structure, on just one side, whereupon the decorative layer would be applied as described above directly onto the uneven surface, opposite the matrix, of the fabric penetrated by matrix material. Such an asymmetrical structure would result in a loss of strength, however, and considerable manufacturing-related complications would have to be dealt with, because the woven fabric laminated substantially on only one side might warp during thermal forming ("bimetal effect"). It is moreover critical for this fabric, which is effectively bound on only one side, to keep the decorative layer sufficiently stable.

To achieve a nevertheless perceptible further reduction in the total thickness of the formed part, provision is therefore made according to the invention for the decorative layer to be fused directly onto the two surfaces of the symmetrically laminated fiber composite material by pressing or foaming, without the coupling agents in the form of the adhesive strip and its backing film. This gives rise to a further reduction in the thickness of the formed part of around 0.2 mm, possibly with even better mechanical properties due to the additional integration of the decorative layer into the fiber composite material.

Before or after introduction into a thermoforming mold, a blank of the fiber composite material, laminated and then decoratively coated on one side, is heated to the glass transition or softening temperature of the matrix accommodating the fiber fabric and is then thermoformed in the mold directly to produce the housing part or similar formed part, which is then obtained ready-equipped with the desired tactile or visual outer surface, without the need for finishing.

The single FIGURE of the drawing shows an overscale sketch of a starting material according to the invention for thermoforming of a flat but mechanically stable plastics formed part with decorative layer.

In this exemplary embodiment, the mechanically stable support 12 laminated with a relatively thick decorative layer 11 (for instance 0.4 mm artificial leather) is laminated from a fiber composite material 13, whose glass fiber woven fabric 14, here in one layer and linen-like, has been laminated conventionally on both sides in each case with a thermoplastic matrix 15. The typically 0.5 mm thick decorative layer 11 laminated onto one surface 16 of this support 12 may, for instance, as sketched thus have entirely the same thickness as the support 12, in the interests of achieving an outer surface 17 with a strong grain profile which is therefore in particular also very pleasant in tactile terms. In this exemplary embodiment, the decorative layer 11 is not adhesively bonded directly onto one of the surfaces 16 of the support 12, but is instead applied to the support 12 with interposition of a backing film 18 using an adhesive tape 19 (each typically 0.1 mm thick).

This results, for the thermoforming starting material overall, as also for the wall thickness of the housing or similar formed part (not shown) thermoformed therefrom, in a wall thickness which is still of the order of just one millimeter.

Since the technological limits with regard to reducing wall thickness would appear to have been reached for flat-domed housing parts produced by plastics injection molding and provided with decorative layers, such as battery covers for mobile appliances, to achieve a nevertheless still significant further reduction in the resultant wall thickness, the invention has changed over to a web- or sheet-form starting material, comprising a fiber composite material 13 provided on one side with the decorative layer 11, from which the housing part is formed by thermoforming. Even if a thick decorative layer 11 with a heavily grained outer surface 17 is applied for tactile reasons, the resultant wall thickness of the formed part is still far less than that of a housing part producible by injection molding. An even greater reduction in wall thickness is achieved if a fiber composite material 13 is used as the thermoforming starting material for the formed part, onto the surface 16 of which the decorative material has been directly foamed or sprayed.

The invention claimed is:

1. A thin-walled flat-domed molded part, in particular a housing part for mobile electronic appliances, which comprises a blank of a thermoformable web- or sheet-form, sandwich-type multi-ply fiber composite material laminated with a plastics matrix, as a support for a laminated-on decorative layer.

2. The molded part as claimed in claim 1, wherein the decorative layer is applied to one of the surfaces of the fiber composite material.

3. The molded part as claimed in claim 1, wherein the decorative layer is adhesively bonded, fused or welded on.

4. The molded part as claimed in claim 1, wherein the decorative layer is foamed or sprayed on.

5. The molded part as claimed in claim 1, wherein the decorative layer is applied with interposition of a backing film using adhesive tape.

6. The molded part as claimed in claim 1, wherein the fiber composite material is laminated on just one side and the decorative layer is applied to the uneven surface, opposite the plastics matrix, of the woven fabric penetrated by matrix material.

7. The molded part as claimed in claim 1, wherein the outer surface of its decorative layer is coarse grained.

8. The molded part as claimed in claim 1, characterized by real leather, artificial leather, textiles, wood or metal as the material for the decorative layer.

9. The molded part as claimed in claim 1, wherein it is the battery cover of a mobile appliance.

* * * * *